United States Patent [19]

Liebert et al.

[11] Patent Number: 5,086,204
[45] Date of Patent: Feb. 4, 1992

[54] METHOD OF PRODUCING A PLUG-TYPE HEAT FLUX GAUGE

[75] Inventors: Curt H. Liebert, Middleburg Hts.; John Koch, Jr., Medina, both of Ohio

[73] Assignee: The United States of America as represented by the Administrator of the National Aeronautics and Space Administration, Washington, D.C.

[21] Appl. No.: 685,062

[22] Filed: Apr. 8, 1991

Related U.S. Application Data

[62] Division of Ser. No. 531,433, May 31, 1990, Pat. No. 5,048,973.

[51] Int. Cl.⁵ .............................................. B23H 9/00
[52] U.S. Cl. .................................. 219/69.17; 374/29; 40/703
[58] Field of Search ............... 219/69.15, 69.17, 69.2; 408/1 R, 703; 374/29, 30; 29/592.1, 854, 868

[56] References Cited

U.S. PATENT DOCUMENTS

| | | | |
|---|---|---|---|
| 2,818,490 | 12/1957 | Dixon et al. | 219/69.15 |
| 3,232,113 | 2/1966 | Malone | 374/30 |
| 3,372,588 | 3/1968 | Ziemke et al. | 374/29 |
| 3,382,714 | 5/1968 | Miller et al. | 374/29 |
| 4,386,248 | 5/1983 | Inoue | 219/69.17 |
| 4,450,315 | 5/1984 | Waterman | 29/592.1 |
| 4,477,687 | 10/1984 | Finney | 29/592.1 |
| 4,500,234 | 2/1985 | Orth et al. | 408/703 |
| 4,510,799 | 4/1985 | Overmier | 73/151 |
| 4,693,644 | 9/1987 | Takahashi et al. | 408/703 |

OTHER PUBLICATIONS

Liebert et al., "Heat Flux Measurements", NASA Technical Memorandum 101428, Jun. 4, 1989.

*Primary Examiner*—Geoffrey S. Evans
*Attorney, Agent, or Firm*—Gene E. Shook; Harold W. Adams; James A. Mackin

[57] ABSTRACT

A method of making a plug-type heat flux gauge in a material specimen in which a thermoplug is integrally formed. The thermoplug and concentric annulus are formed in the material specimen by electrical discharge machining and trepanning procedures. The thermoplug is surrounded by a concentric annulus through which thermocouple wires are routed. The end of each thermocouple wire is welded to the thermoplug, with each thermocouple wire welded at a different location along the length of the thermoplug.

5 Claims, 2 Drawing Sheets

METHOD OF PRODUCING A PLUG-TYPE HEAT FLUX GAUGE

ORIGIN OF THE INVENTION

The invention described herein was made by employees of the U.S. Government and may be manufactured and used by or for the Government for governmental purposes without the payment of any royalties thereon or therefor.

STATE OF COPENDENCY

This application is a division of application Ser. No. 531,433 which was filed May 31, 1990, now U.S. Pat. No. 5,048,973.

FIELD OF THE INVENTION

The present invention relates generally to methods of producing heat flux gauges, and more particularly to the production of plug-type heat flux gauges having thermoplugs that are integrally formed into a specimen material.

DESCRIPTION OF THE RELATED ART

Recently, there has been increasing need for small, reliable, accurate and easily built heat flux gauges. For example, heat flux gauges are needed to obtain transient and steady-state surface heat flux data for verification of models relating to heat transfer, durability and aerodynamics. In many applications heat flux gauges are required to be accurate over wide ranges of heat flux values that vary over wide temperature ranges. For example, in order to obtain rapid transient surface heat flux measurements on turbine blades utilized in spacecraft, a heat flux gauge may be required to provide accurate measurements for surface heat flux values varying from about 0.13 to 20 MW/m$^2$ over a temperature range of 100 to 1400 K.

Water-cooled heat flux gauges are available for measurement to about 10 MW/m$^2$, but only at surface temperatures that are maintained between 280 to 360 K. Also, water-cooled heat flux gauges tend to be relatively e.g., often greater than 2.0 cm in diameter and length. Thus, because of their relatively large size and narrow temperature range, water-cooled heat flux gauges often cannot be used.

Another type of heat flux gauge is the plug-type heat flux gauge. Typically, plug-type heat flux gauges include a thermoplug that is screwed or welded into a specimen material having an active surface, creating a seam between the active surface and the thermoplug. This seam can introduce large discontinuities in surface temperature, resulting in very large errors in heat flux measurement. It is extremely difficult to determine the uncertainty in the resulting heat flux measurements due to the seam. Thus, the lack of accuracy and precision of conventional plug-type heat flux gauges may prohibit their use.

SUMMARY OF THE INVENTION

It is an object of the invention to provide an improved plug-type heat flux gauge that is accurate over wide ranges of heat flux values that vary over wide temperature ranges.

Another object of the invention is to provide an improved plug-type heat flux gauge that is accurate, reliable and which may be small in size.

Still another object of the invention is to provide an improved plug-type heat flux gauge that accurately measures transient and steady-state surface heat flux.

Yet another object of the invention is to provide a method for easily producing an improved plug-type heat flux gauge that achieves the foregoing objects.

In order to achieve the foregoing and other objects, in accordance with the purposes of the present invention as described herein, a thermoplug is formed in a specimen material using, for example, electrical discharge machining and trepanning procedures. The machining produces an annulus that surrounds an integral thermoplug. Because the thermoplug is an integral part of the specimen material, there is no seam between the thermal plug and the active surface of the specimen material. Therefore, the very large errors in heat flux measurement due to the seam present in prior art plug-type heat flux gauges do not occur in the present invention. Also, there is no need to determine the uncertainty of heat flux measurement caused by the presence of such a seam.

The ends of thermocouple wires are welded along the length of the thermoplug in order to form hot junctions. The thermocouple wires are routed through the annulus to the rear of the specimen material, where they may be connected to larger diameter lead-wire assemblies. A back cover may be welded to the back wall of the specimen material, thereby enclosing the thermoplug and annulus and trapping a thermal insulator, e.g., air within the annulus and behind the thermoplug.

In a preferred method of making the invention electrical discharge machining is used to intermittently discharge an electric spark through a gap between the specimen material and an electrode which includes a hole along its length. The specimen material and the electrode are immersed in a dielectric fluid and, as current is applied, sparks are emitted from the end of the electrode tube, detaching portions of the specimen material. The thermoplug is formed within the hole of the electrode, as the electrode descends into the specimen material, thereby forming the thermoplug as an integral and unitary part of the specimen material.

These and other features and advantages of the present invention will become more apparent with reference to the following detailed description and drawings. However, the drawings and description are merely illustrative in nature and not restrictive.

BRIEF DESCRIPTION OF THE DRAWINGS

The accompanying drawings illustrate several aspects of the present invention and, together with the descriptions, serve to explain the principles of the inventions. In the drawings.

DETAILED DESCRIPTION OF THE PREFERRED EMBODIMENTS

Figure 1:
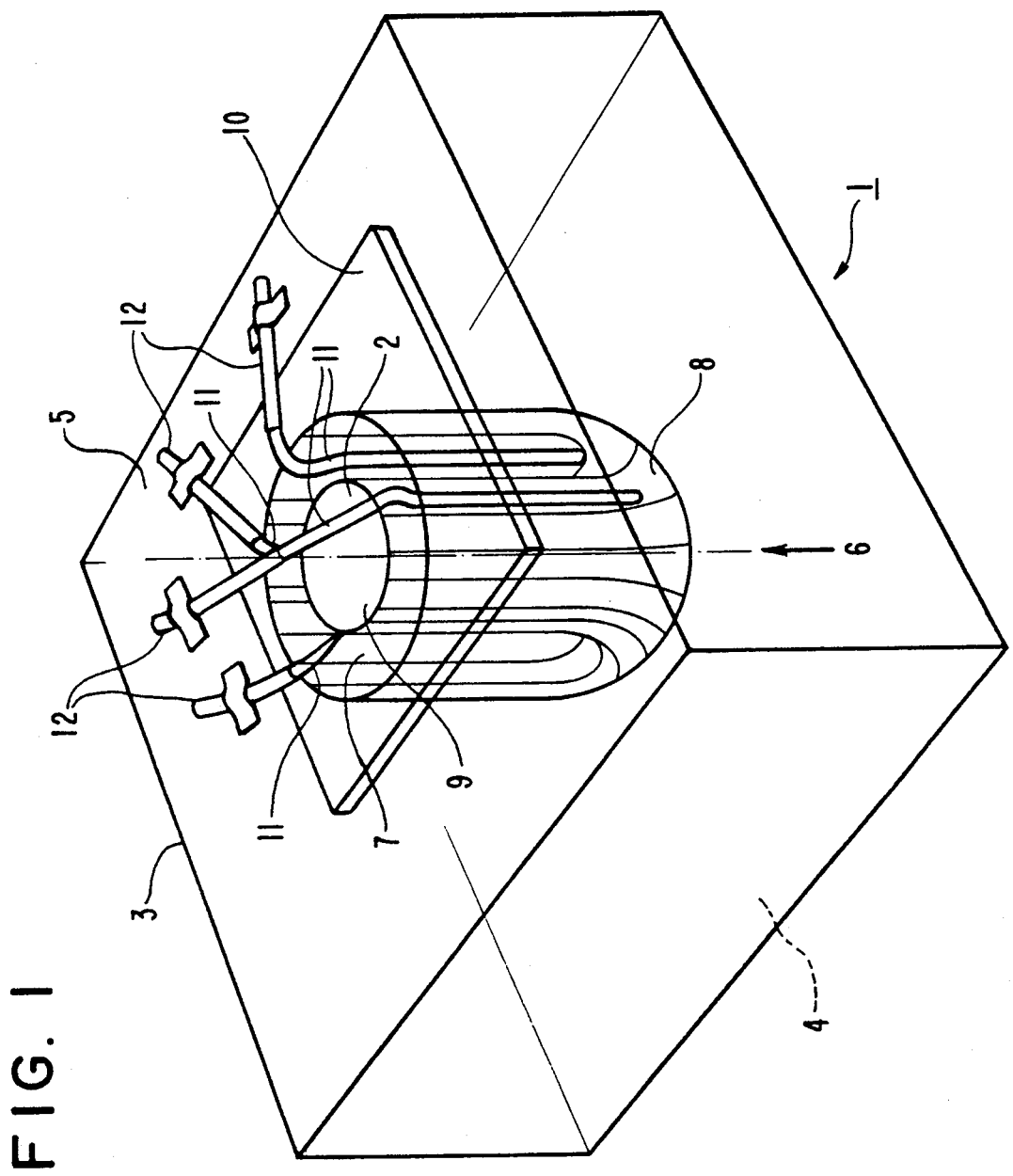
FIG. 1 is an overall view of the plug-type heat flux gauge according to the present invention.

FIG. 1 shows an overall view of a plug-type heat flux gauge 1 according to the present invention. A thermoplug 2 is integral with material specimen 3. Material specimen 3 includes front surface 4 (lower surface in FIG. 1) and back surface 5 (upper surface in FIG. 1). Front surface 4 of material specimen 3 is exposed to an energy source, e.g., an arc-lamp for radiating incident thermal radiation 6. Thermoplug 2 is insulated on all surfaces except front surface 4 and, therefore, heat transfer within thermoplug 2 may be assumed one-dimensional. Concentric annulus 7 surrounds the sides of thermoplug 2. Because concentric annulus 7 is formed only partially through material specimen 3, a floor 8 of concentric annulus 7 is formed a finite distance from front surface 4 of material specimen 3. Concentric annulus 7 is formed into material specimen 3 using any appropriate method, e.g., trepanning, electrical discharge machining or the like. Trepanning consists of machining a circular groove into a material. For example, a hole saw may be applied to back surface 5 of material specimen 3 in order to form concentric annulus 7 and to form thermoplug 2 integral with material specimen 3. The length of thermoplug 2 is taken as the distance from front surface 4 of material specimen 3 to a back surface 9 of thermoplug 2.

Since thermoplug 2 is an integral part of material specimen 3, there is no seam connecting thermoplug 2 to material specimen 3. As discussed above, conventional plug-type heat flux gauges include such seams which can cause large errors in heat flux measurement. Further, determination of the uncertainty in heat flux measurement caused by such seams is very difficult. Therefore, a plug-type heat flux gauge according to the present invention is advantageous in that there is no such seam. In a preferred method of forming concentric annulus 7 into material specimen 3, a process known as electrical discharge machining is used. Electrical discharge machining is well known in the machining art. One example of an electrical discharge machining apparatus is described in U.S. Pat. No. 2,818,490 issued to Dixon et al. Thermoplug 2 and concentric annulus 7 are formed by intermittently discharging an electric spark through a gap between material specimen 3 and an electrode. Material specimen 3 and the electrode are immersed in a dielectric fluid, e.g., refined kerosene. The electrode which is made from a conductor, e.g., copper-tungsten, includes a hole along its length. Sparks are emitted from the electrode and strike material specimen 3, thereby detaching material. The electrode forms thermoplug 2 and concentric annulus 7 as the electrode descends into material specimen 3, i.e., thermoplug 2 is formed within the hole of the electrode. Concentric annulus 7 is machined only part way through material specimen 3, thereby forming thermoplug 2 as an integral part of material specimen 3. Thermoplugs of all sizes and shapes may be formed using this process. For example, thermoplug diameters of 0.1 to 0.2 cm, thermoplug lengths of 0.1 to 0.3 cm and concentric annulus widths of 0.03 to 0.08 cm having been formed using electric discharge machining. Thus, plug-type heat flux gauge 1 according to the present invention may be made relatively small compared with the size of conventional water-cooled heat flux gauges. Consequently, plug-type heat flux gauge 1 according to the present invention may be utilized in measuring heat flux in extremely small material specimens.

As shown in FIG. 1, a back cover 10 encloses thermoplug 2 and concentric annulus 7. Back cover 10 is secured, e.g., welded, to back surface 5 of material specimen 3, thereby trapping a thermal insulator, e.g., air, within concentric annulus 7 and behind thermoplug 2. This thermal insulator minimizes heat transfer between thermoplug 2, the surrounding wall of heat absorbed from front surface 4 of material specimen 3 to be transferred nearly one-dimensionally along thermoplug 2.

The ends of thermocouple wires 11, e.g. Chromel-Alumel, are spot-welded along thermoplug 2 at various distances from front surface 4 of material specimen 3. Thermocouple wires 11 are routed through concentric annulus 7 to back surface 5 of the specimen material 3. Ceramic material may be placed between thermocouple wires 11 and the walls of material specimen 3 and thermoplug 2, thereby preventing the bare thermocoupled wires 11 from touching metallic parts. Thermocoupled wires 11 may be connected, e.g., spliced, to larger diameter lead wire assemblies 12 fastened to back surface 5 of material specimen 3.

Heat flux may be calculated from measured thermoplug temperatures using a temperature variant thermal property inverse heat conductive problem method, e.g., heat storage equation:

$$q_s = \int_O^L (\rho C_p \delta T / \delta t) dZ$$

SYMBOLS $C_p$: specific heat at constant pressure, J/kg K
L: length of thermoplug, cm
$q_s$: surface heat flux, MW/m$^2$
T: temperature, K
t: time, sec
Z: thermocouple location along axis of axis of thermoplug, m
P:ρdensity, kg/m$^3$ In this equation, $\delta T/\delta t$ is evaluated by differentiating least-squares curve fit equations expressing measured thermoplug temperatures as a function of time at each temperature measurement location. Thermal properties are evaluated at local temperatures measured on the thermoplug.

EXAMPLE

A plug-type heat flux gauge 1 according to the present invention was formed in back surface 5 of a flat plate material specimen having a thickness of 0.350 cm. Thermoplugs 2 were formed by electrical discharge machining to have a diameter of 0.188 cm and a length of 0.330 cm. Chromel-Alumel thermocouple wires 11 were spot-welded at distances of 0.00508, 0.0279, 0.175 and 0.330 cm measured from front surface 4 of material specimen 3. Lead wire assemblies 12 included Choromel-Alumel wires having a diameter of 0.015 cm encased in ceramic tubing. The ceramic tubing, in turn, was encased in Inconel sheath material to form an assembly. The diameter of each thermocouple wire 11 was 0.00762 cm. Each thermocouple wire 11 was spot-welded to thermoplug 2, forming a cylindrical hot junction having a diameter of 0.0152 cm and a thickness of 0.00508 cm. The hot junction closest to the front surface 4 of material specimen 3 was welded to the bottom of a hole drilled through floor 8 of concentric annulus 7 along a line parallel to and 0.100 cm from the centerline of thermoplug 2. The width of concentric annulus 7 was 0.080 cm. This hole was drilled at a depth of 0.00508 cm from front surface 4 of material specimen 3. The other three hot junctions were welded to thermoplug 2 and were circumferentially located 120° from each other. The thermocouple wires 11 were extended from the hot junction in a direction perpendicular to the surface on which they were welded, and then routed to lead wire assemblies 12.

Figure 2:
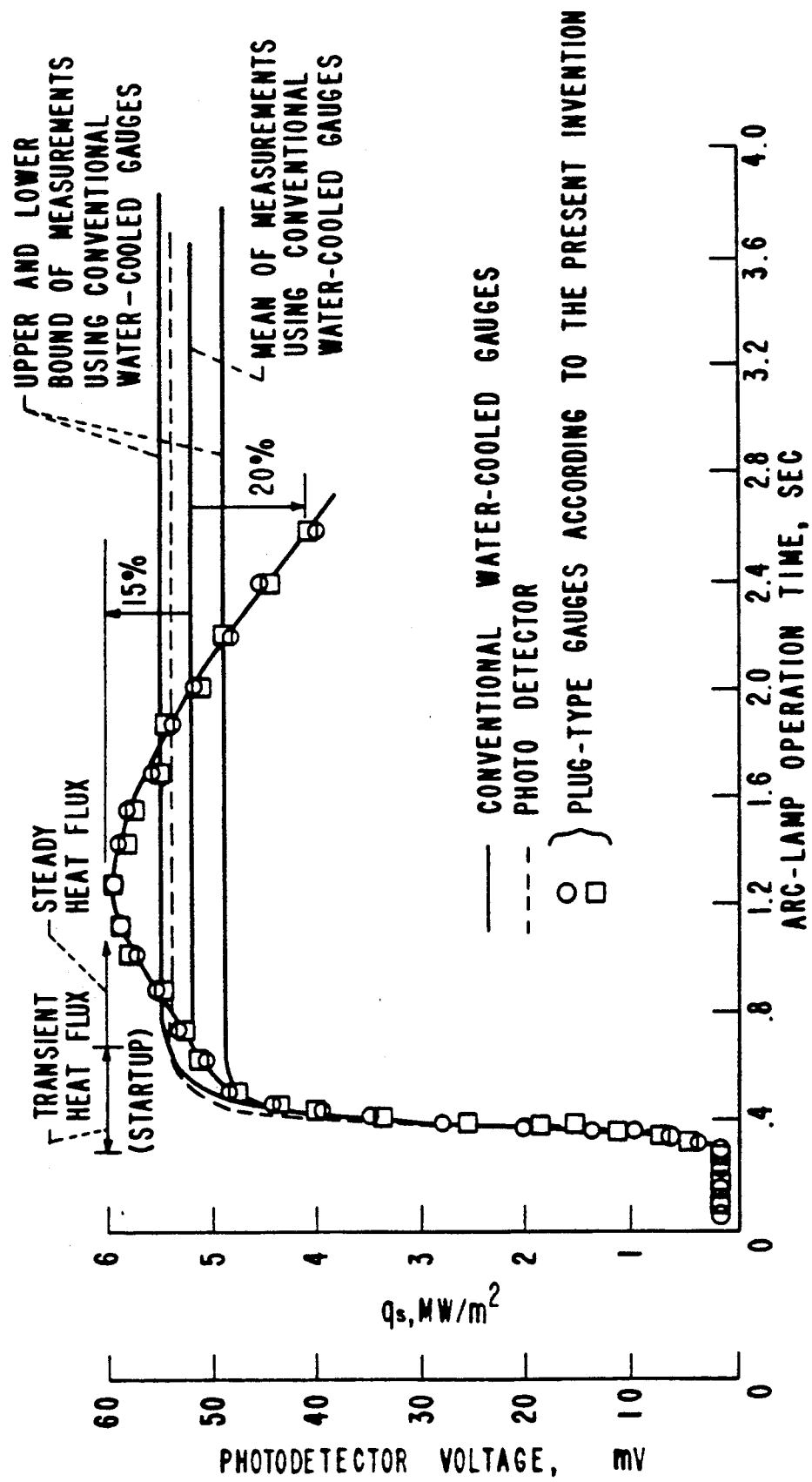
FIG. 2 is a graph that shows relative agreement between the heat flux values obtained from the plug type heat flux gauge of the present invention and conventional heat flux gauges.

As shown in FIG. 2 satisfactory agreement in both transient and steady-state surface heat flux measurements between conventional water-cooled gauges and plug-type heat flux gauge 1 was obtained. An arc lamp was used as the energy source. The arc lamp start-up time period between about 0.3 and 0.7 seconds is defined in FIG. 2 as the region of transient heat flux, while time after about 0.7 seconds is defined as the region of steady-state heat flux. The timing of these regions was confirmed with a photodetector that simultaneously measured an increase in millivolt output of the arc lamp of about 3 to 54 MW at 0.3 to 0.7 sec (128 MV/sec) after which the photodetector output remained constant. The round and square symbols represent the mean of three repeated measurements taken with three separate thermocouple installations on each plug-type heat flux gauge 1. The solid single line in the transient region represents the cubic least-squares curve-fit relative to 100 transient heat flux data points taken with the conventional water-cooled heat flux gauges. The mean of the steady-state heat flux data is also shown in FIG. 2.

Numerous modifications and adaptations of the present invention will be apparent to those so skilled in the art and thus it is intended by the following claims to cover all modifications and adaptations which fall within the true spirit and scope of the invention.

What is claimed is:

1. A method of producing a plug-type heat flux gauge with a thermoplug integrally formed in a member having a first surface exposed to an energy source which heats said member and a second surface oppositely disposed from said first surface away from said energy source, said method comprising the steps of removing material from said second surface of said member in a circular groove thereby forming an annulus, forming a floor in said annulus at a predetermined finite distance from said first surface thereby forming said thermoplug from the material of said member which extends from said first surface to said second surface with no seam between said thermoplug and said member and said annulus encircling said thermoplug from said floor to said second surface, securing a plurality of thermocouple wires to said thermoplug at various predetermined distances from said first surface, and covering said annulus and thermocouple wires.

2. A method of producing a plug-type heat flux gauge as claimed in claim 1 wherein air is trapped in the annulus by a cover.

3. A method of producing a plug-type heat flux gauge as claimed in claim 1 wherein a circular groove is machined in the second surface of the member by trepanning.

4. A method of producing a plug-type heat flux gauge as claimed in claim 1 wherein the material is removed from the member by electrical discharge machining.

5. A method of producing a plug-type heat flux gauge as claimed in claim 4 wherein a thermoplug having a diameter between about 0.1 cm and about 0.2 cm with a length between about 0.1 cm and 0.3 cm and an annulus with a width between about 0.03 cm and about 0.08 cm is formed in said member.

* * * * *